(12) United States Patent
Leard et al.

(10) Patent No.: US 8,175,427 B2
(45) Date of Patent: May 8, 2012

(54) APPARATUS AND METHODS FOR USE OF A TUNABLE OPTICAL SOURCE IN SAFETY CURTAIN APPLICATIONS

(75) Inventors: Francis Lawrence Leard, Sudbury, MA (US); Hassan R. Manjunath, Nashua, NH (US); James Edward Dogul, Hudson, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 614 days.

(21) Appl. No.: 11/857,243

(22) Filed: Sep. 18, 2007

(65) Prior Publication Data
US 2009/0073533 A1    Mar. 19, 2009

(51) Int. Cl.
*G02B 6/28*    (2006.01)
(52) U.S. Cl. ............... 385/24; 385/37; 385/45; 398/82; 398/84; 398/93; 398/95
(58) Field of Classification Search .............. 385/24, 385/37, 45; 398/79, 82–85, 93, 95
See application file for complete search history.

(56) References Cited

U.S. PATENT DOCUMENTS

| | | | |
|---|---|---|---|
| 5,440,416 A * | 8/1995 | Cohen et al. | 398/82 |
| 5,717,510 A * | 2/1998 | Ishikawa et al. | 398/199 |
| 6,263,127 B1 * | 7/2001 | Dragone et al. | 385/24 |
| 6,320,539 B1 * | 11/2001 | Matthews et al. | 342/375 |
| 6,321,001 B1 * | 11/2001 | Heflinger | 385/24 |
| 6,420,985 B1 * | 7/2002 | Toughlian et al. | 341/137 |
| 6,754,410 B1 * | 6/2004 | Doerr et al. | 385/16 |
| 6,760,521 B2 * | 7/2004 | Watanabe | 385/50 |
| 6,925,262 B2 * | 8/2005 | Ooi et al. | 398/147 |
| 7,400,793 B2 * | 7/2008 | Tabuchi et al. | 385/24 |
| 2002/0093662 A1 * | 7/2002 | Chen et al. | 356/491 |
| 2003/0112442 A1 * | 6/2003 | Baney et al. | 356/477 |
| 2004/0239944 A1 * | 12/2004 | Shirai et al. | 356/481 |

* cited by examiner

*Primary Examiner* — Daniel Petkovsek
(74) *Attorney, Agent, or Firm* — Schwegman, Lundberg & Woessner, P.A.

(57) ABSTRACT

Apparatus and methods for using a tunable optical source in safety curtain applications provide for enhanced operation of the safety curtain. In an embodiment, a safety curtain includes a transmit unit and a receive unit to operate as the safety curtain, where a single tunable light source generates different wavelengths of light and a single detector is used to detect the generated light.

25 Claims, 3 Drawing Sheets

APPARATUS AND METHODS FOR USE OF A TUNABLE OPTICAL SOURCE IN SAFETY CURTAIN APPLICATIONS

BACKGROUND

Factory environments often include machinery that present a risk of personal injury. Sensing equipment, such as electro-sensitive protective equipment, for example a light curtain assembly, may be used to provide a safety feature to potentially dangerous industrial equipment. The sensing equipment is programmable to cause the machinery to revert to a safe condition before a person can be placed in a hazardous situation. Enhancements to safety equipment should include the reduction of complexity and/or cost to provide a safe working environment.

BRIEF DESCRIPTION OF THE DRAWINGS

Embodiments of the invention are illustrated by way of example and not limitation in the figures of the accompanying drawings in which.

DETAILED DESCRIPTION

The following detailed description refers to the accompanying drawings that show, by way of illustration, details and embodiments in which the invention may be practiced. These embodiments are described in sufficient detail to enable those skilled in the art to practice embodiments of the present invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

Figure 1:
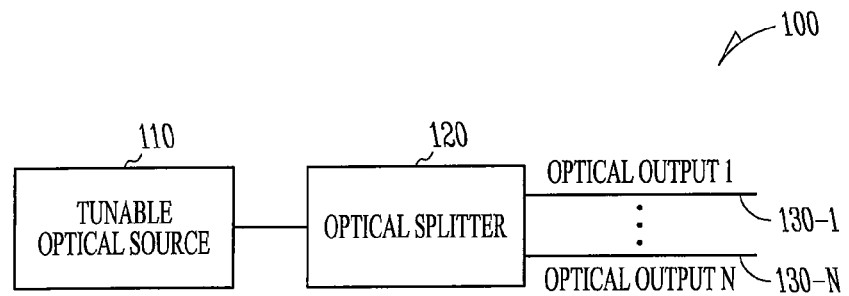
FIG. 1 depicts an embodiment of an apparatus having a tunable optical source to generate light at a plurality of wavelengths and an optical splitter to separate light of different wavelengths into different paths to a detector.

FIG. 1 depicts an embodiment of an apparatus 100 having a tunable optical source 110 to generate light at a plurality of wavelengths and an optical splitter to separate light of different wavelengths into different paths 130-1 . . . 130-N to a detector. Tunable optical source 110 may be realized as an optical source with associated optics and/or optical devices to provide an output at a wavelength having a narrow linewidth such that adjustment of the associated optics and/or optical devices provides another output at a different wavelength also having a narrow linewidth. The associated optics and/or optical devices are not limited to providing output light at two different wavelengths. The various outputs from such a tunable optical source may provide light at different wavelengths. Control circuitry may be used to manage the associated optics and/or optical devices to select the wavelength of the output light and to regulate the timing of the output of the different wavelengths of light. The output may also be provided as a collimated light beam for coupling into the optical splitter. In an embodiment, tunable optical source 110 may be a tunable laser diode, which may be used without additional associated optics and/or optical devices to provide different wavelengths of light. Control circuitry may be used to select the wavelength of the output light from the tunable laser diode and to regulate the timing of the output of the different wavelengths of light.

Optical splitter 120 may be realized in a number of different configurations to separate light of different wavelengths into different paths 130-1 . . . 130-N to a detector. The optical splitter may be a reconfigurable optical add-drop multiplexer (ROADM). Generally, a ROADM is a form of an optical add-drop multiplexer that may be realized in a number of configurations to remotely add and/or drop wavelengths. A ROADM typically can provide for remotely switching traffic from a wavelength-division multiplexing (WDM) system to individual wavelengths of light to be added and/or dropped from a transport optical fiber without converting the signals to electronic signals and back again to optical signals. The optical splitter may be an array waveguide device. The optical splitter may be realized as an array waveguide grating (AWG). An AWG is composed of a grating that is waveguide based and contains control circuitry for controlling which wavelengths are allowed passage. Other wavesplitting technology can be used for the optical splitter, some examples include resonant rings, spheres, photonic band gap filter banks, Bragg gratings in fiber or waveguides, and other wavelength distribution structures. The optical splitter may be structured as a combiner/splitter such that it may be used to receive an input from a single path and direct the input to one of a number of optical output paths and it may be used to take an input from one or more of a number of optical paths and place the input on a single output path. For instance, an optical splitter structured as a combiner/splitter may be used as a 1:N splitter or as an N:1 combiner. The N optical paths may be coupled to N optical fibers. The coupling may be integrated onto a single optical integrated circuit chip. When used as an N:1 combiner, the optical combiner/splitter may direct light from different optical transmission paths to a single common detector.

Tunable optical source 110 and optical splitter 120 may be arranged in a safety curtain. Apparatus 100 may include control circuitry responsive to operation of a detector in the safety curtain to initiate safety actions. In an embodiment, apparatus 100 may include control circuitry to modulate an output wavelength from tunable optical source 110 to provide communications via the safety curtain. Modulation for communication may be preformed at the gigahertz range or other at other rates depending on the application. The control circuitry may be may be implemented in a semiconductor device (i.e., a "chip"). Alternatively, in various embodiments, the control circuitry, tunable optical source 110, and optical splitter 120 and may be integrated in separate semiconductor devices forming part of a family of chips called a "chip set." A chip set may be realized as a group of microchips designed to work and to be sold as a unit in performing one or more related functions.

Figure 2:
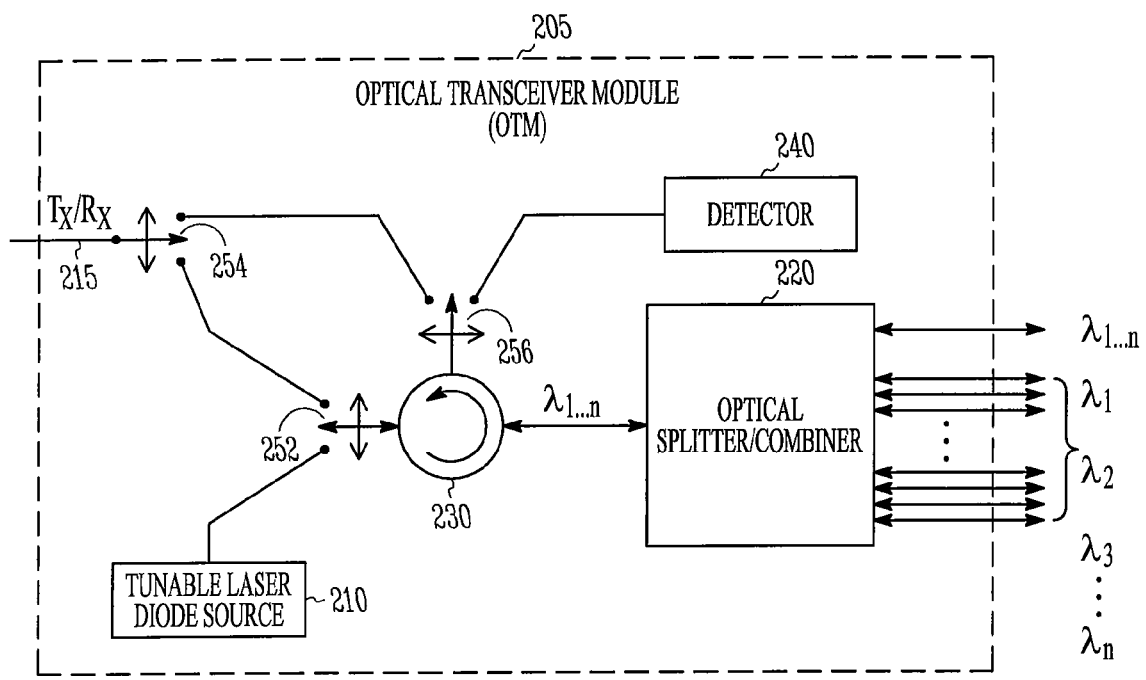
FIG. 2 depicts features of an embodiment of an optical transceiver module for use in safety curtain applications.

FIG. 2 depicts features of an embodiment of an optical transceiver module (OTM) 205 for use in safety curtain applications. The tunable optical source 110 and optical splitter 120 of FIG. 1 may be realized in OTM 205. OTM 205 may include a tunable light source 210, an optical splitter/combiner 220, an optical separator 230, a detector 240, and switches 252, 254, and 256. Optical separator 230 allows light to pass from a light source in OTM 205 to optical splitter/combiner 220 and/or allows light from optical splitter/combiner 220 to pass to a detector 240. The light source in OTM 205 may be tunable light source 210, such as a tunable laser diode 210, or light from bypass line 215 from a prior circuit that provides different wavelengths of light. Optical separator 230 may be a Faraday isolator. Switch 252 may be activated by control circuitry to select the bypass line 215 or tunable laser diode 210. Switch 254 may be activated to send light from bypass line 215 to switch 252 to provide output light from OTM 205 or to send light from bypass line 215 to switch 256. Switch 256 may be activated to provide light to detector 240 from bypass line 215 or to provide light from optical splitter/combiner 220 received at OTM 205. In an embodiment, only one tunable optical source and one detector are used in OTM 205. The one tunable optical source and one detector may be a laser diode and an appropriate photodiode. In such a configuration, one laser diode and one photodetector may be used regardless of the size of the safety curtain. This arrangement may provide for reduced costs.

Switches 252, 254, and 256 may be driven by control circuitry. The control of switches may be managed remotely through control hardware or combination of control hardware and control software. Switches 252, 254, and 256 may be manually set on configuring the safety curtain in which optical transceiver module 205 is disposed. With optical transceiver module 205 located in a transmit unit of a safety curtain in which optical transceiver module 205 provides the initial light source, switch 252 can be set to allow light from tunable laser source diode 210 to pass to optical isolator 230 and switch 254 can be set such that bypass 215 is not coupled to switch 252 or to switch 256. With optical transceiver module 205 located in a transmit unit of a safety curtain in which optical transceiver module 205 does not provide the initial light source, switch 254 can be set to provide light from bypass line 215 to switch 252, which can be set to allow light from bypass line 215 to pass to optical isolator 230. With optical transceiver module 205 located in a receive unit of a safety curtain, switch 256 can be set to allow light from optical splitter/combiner 220, via optical isolator 230, to be directed to detector 240 or sent to switch 254 to direct the light onto bypass line 215 at the receive unit. With optical transceiver module 205 located in a receive unit of a safety curtain, switch 252 can be set such that no light is directed to optical isolator 230.

Figure 3:
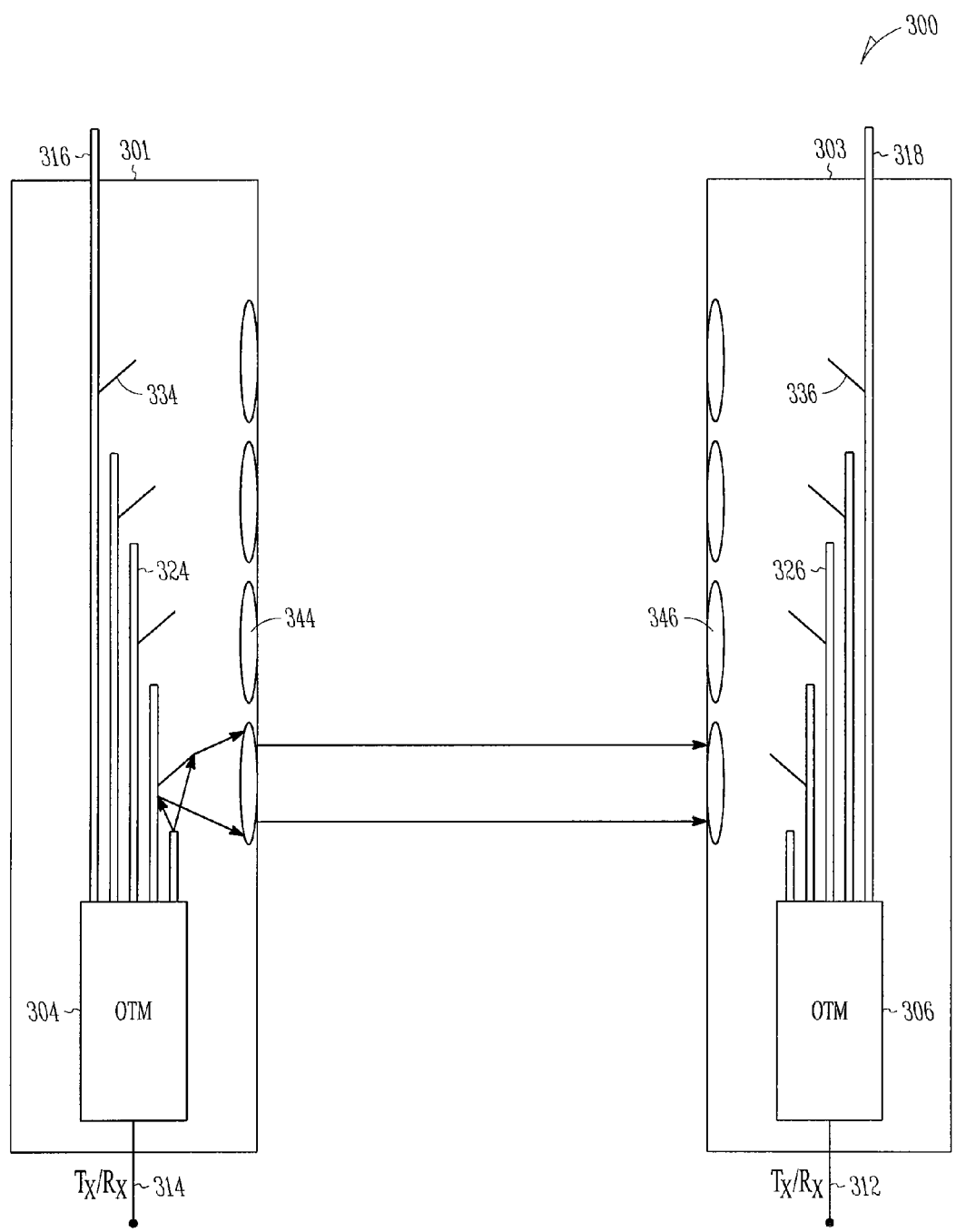
FIG. 3 depicts features of a system having a light curtain with a unit that uses a tunable light source and an optical splitter to transmit a unique wavelength channel at each port of the unit with a mated unit of corresponding arrangement to receive light having the set wavelength.

FIG. 3 depicts features of a system having a light curtain with a unit 301 that uses a tunable light source and an optical splitter to transmit a unique wavelength channel at each port of unit 301 with a mated unit 303 of corresponding arrangement to receive light having the set wavelength. Unit 301 may include OTM 304, optical fibers 324, turning mirrors 334, and lenses 344. Unit 303 may include OTM 306, optical fibers 326, turning mirrors 336, and lenses 346. OTM 205 of FIG. 2 may be used in both OTM 304 and OTM 306. In an embodiment, the tunable light source in each of OTM 304 and OTM 306 is a tunable laser diode. An optical splitter/combiner in each of OTM 304 and OTM 306 may be a ROADM, an AWG, or other optical device to output light to one of several paths based on the wavelength of the light. The output form OTM 304 may be directed onto optical fibers 324, which propagate light along various lengths of light curtain unit 301. Optical fiber 316 provides a bypass line to a transmit unit configured similar to transmit unit 301. Unit 301 includes an input bypass line 314 to receive (or transmit) an optical signal. Each of optical fibers 324 provides light for free space transmission from light curtain unit 301 to light curtain unit 303 along a path that is different for each light output from optical fibers 324. Each of turning mirrors 334 may be used to direct light from each of optical fibers 324 to its associated lens 344. Turning mirrors 334 may be used to avoid bending optical fibers 324. A turning mirror may be configured at the end of its associated optical fiber and oriented such that light from the end of the optical fiber is directed to its associated lens as demonstrated in FIG. 3. In an embodiment, turning mirrors 334 provide a redirection of light from each of optical fibers 324 of 90°. Other angles may be used for different configurations of optical fibers 324 and lenses 344. Alternatively, turning mirror may be structured as an optical medium integrated with its associated optical fiber so that light from its associated fiber is directed off the optical fiber at a point in line with its associated lens to transmit the light towards safety curtain 303.

In an embodiment, safety curtain unit 303 mated to safety curtain unit 301 is configured in a similar manner corresponding to safety curtain unit 301. This common configuration allows two units of common design to be used as the transmit unit of a safety curtain and as a receiver unit of the safety unit. As shown in FIG. 3, light from one of lenses 344 of safety curtain unit 301 is directed to a corresponding lens of lenses 346 in safety curtain unit 303 at the receiving end. Light received at a lens of safety curtain unit 303 is directed to a corresponding fiber of optical fibers 326 via its turning mirror 336, which directs the light to OTM 306. Optical fiber 318 provides a bypass line from a receive unit configured similar to receive unit 303. Unit 303 includes an output bypass line 312 to transmit (or receive) an optical signal. With OTM 304 transmitting a unique wavelength of light on each of fibers 324, a unique wavelength is received by a matching optical fiber coupled to a matching optical splitter/combiner and is processed to eliminate any radiation from any neighboring safety curtain emitter. By using discrete wavelengths in conjunction with a compact spectroscopic optical splitter/combiner, crosstalk may be substantially reduced or eliminated.

The example configuration of FIG. 3 illustrates a system in which each channel in a safety curtain has a unique wavelength that is not recognized by any other channel. Channel skipping or spatial patterning can be implemented from a single source in an OTM for additional functionality. In addition, temporal communications can be implemented for optical cell communications. In an embodiment, units of the same configuration can be stacked to form longer lengths of curtain without having channel interference on any channel.

Various embodiments implementing arrangements similar to those shown in FIG. 3 that use different wavelengths from a tunable light source may avoid potential cross talk problems at the light reception unit, which may be associated with conventional light curtains that use multiple sources that emit at the same wavelength. The cross talk potential associated with multiple sources at the same wavelength may be addressed by using a separate photodiode for each unique and separate source. Each detector on the receiver side is matched to a single emitter on the transmit (emission) side in which the angular spread of the beam from each source on the emission side is limited and the field of view of each detector on the receiver side is limited. In addition to this optical arrangement of matching sources and photodiodes, output from each emitter can be coded using a unique timing signature with its matching receiver keyed to this temporal signature.

However, using multiple detectors for multiple sources affects the cost and reliability of a system. As the beam width of emissions and field of views of detectors are reduced to provide the optical arrangement of matching sources and photodiodes, aligning the light sources with their receivers becomes more difficult. In addition, multiple sources, single wavelength arrangements that use temporal signatures, which may not be orthogonal, may have portions of their signatures shared with those in a neighboring receiving volume, which contributes to a cross-talk problem. Further, due to space and cost constraints, there may be a limited bandwidth that can be used for temporal signatures. In addition, the multiple optoelectronic components for such multiple sources, single wavelength arrangements to operate a light safety curtain drive the costs for implementing any one light curtain, where the costs increase for longer lengths of curtains.

In an embodiment, wavelength slicing is used in which a single tunable light source, such as a single tunable laser diode, emits light into an optical device that directs the light into one of multiple paths dependent on the wavelength. In an example embodiment, a single tunable laser diode that emits into wavelength distribution structure, such as an AWG or ROADM, is used both in transmit units and receive units of a light safety curtain. Manufacture of identical units for both transmit units and receive units of a safety curtain may reduce the overall manufacturing cost and provide enhanced reliability due to the reduction in processing and design. Configuring such identical units as a transmit unit or as a receive unit can be set during the configuration of the units as a safety curtain.

Figure 4:
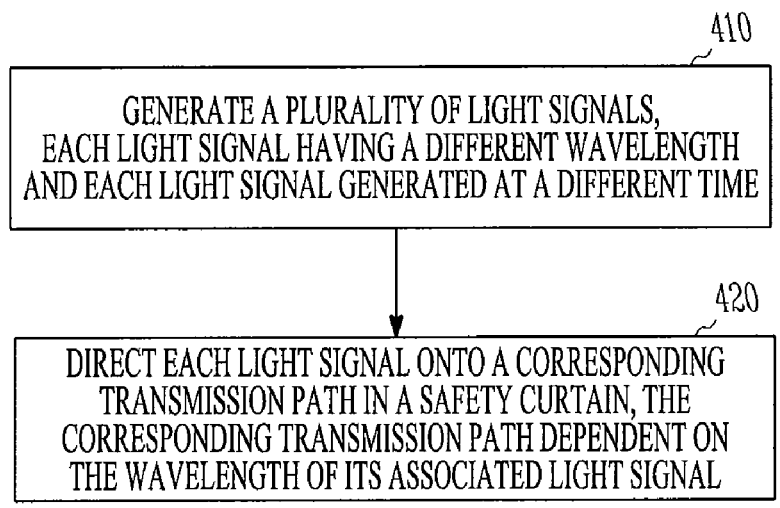
FIG. 4 shows features of an embodiment of a method to operate a safety curtain using a tunable light source.

FIG. 4 shows features of an embodiment of a method that generates multiple light signals in a safety curtain, where the light signals are of different wavelengths. At 410, a number of light signals are generated. Each light signal has a wavelength different form the other light signals and each light signal is generated at a time different from the other light signals. At 420, each light signal is directed onto a corresponding transmission path in a safety curtain. The corresponding transmission path, on which the light signal propagates, is dependent on the wavelength of its associated light signal. Each light signal from its corresponding transmission path may be directed to an optical multiplexer of a receiver to provide each light signal to a common detector. The output of the common detector may be monitored to provide a response to a safety event. Motion of an object or individual through the free space transmission path of one or more of the signals causes a disruption to the reception of the light signals indicating the occurrence of a safety event to which a response may be made. In an embodiment, each light signal can be chirped to determine motion of an object traversing the safety curtain. The modulation rate for object detection may be realized at the megahertz range or other range of rates depending on the application.

Figure 5:
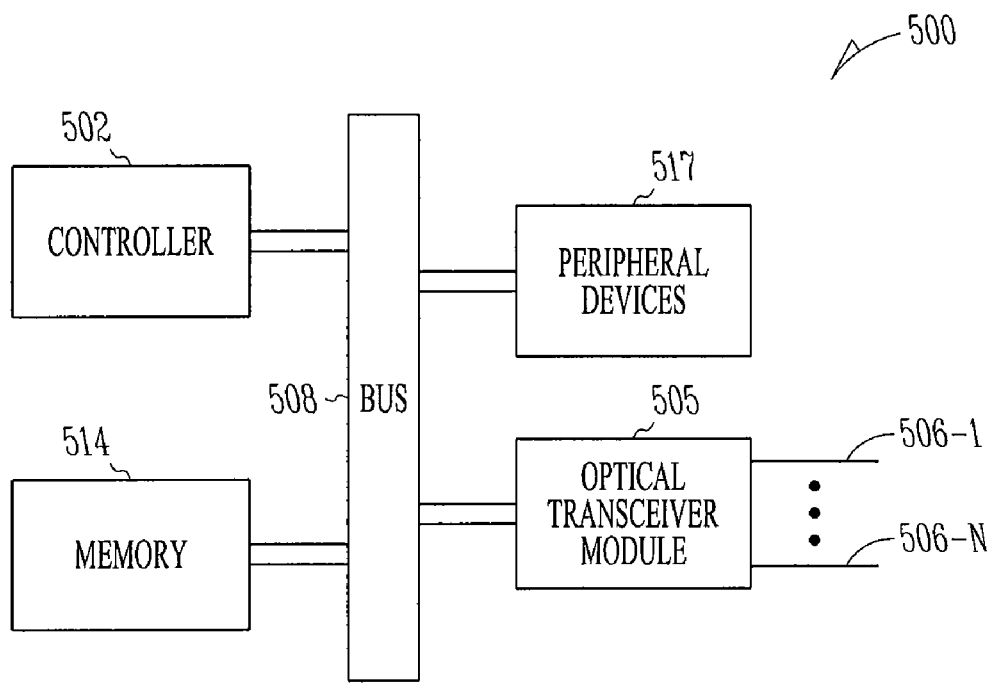
FIG. 5 shows features of a system having a safety curtain using a tunable light source.

FIG. 5 illustrates a block diagram of features of an embodiment of a system having a tunable light source to generate light of different wavelengths for operation of a safety curtain. System 500 may include a controller 502 and a bus 508, where bus 508 provides a communication path between controller 502 and an optical transceiver module 505 of a light safety curtain. Optical transceiver module 505 couples light of different wavelengths on different transmission mediums 506-1 . . . 506-N for a unit of the light safety curtain. Transmission mediums 506-1 . . . 506-N may be optical fibers to provide the light to output ports of an emission side of the light safety curtain. Optical transceiver module 505 and its associated light safety curtain may be realized in various embodiments including the embodiments discussed with respect to FIGS. 1-4.

In an embodiment, controller 502 is a processor. Bus 508 may be a parallel bus. Bus 508 may be a serial bus. Bus 508 may be compatible with Peripheral Component Interconnect (PCI) or with PCI express. Bus 508 may be a collection of different transmission media among the various components of system 500. An embodiment, system 500 may include a memory 514 and an additional peripheral device or devices 517 coupled to bus 508. Peripheral devices 517 may include one or more displays, alphanumeric input devices, cursor controls, memories, one or more network communications interfaces, and/or other control devices that may operate in conjunction with controller 502. Various components of system 500 may be realized with a hardware configuration, a software based configuration, or combination of hardware/software configurations.

In an embodiment, controller 502 includes control circuitry to manage the operation of optical transceiver module 505. Controller 502 may be integral to the light safety curtain in which optical transceiver module 505 is arranged. Controller 502 and optical transceiver module 505 may be integrated onto a common chip or chip set. Controller 502 may regulate timing to change an output wavelength from the optical source in optical transceiver module 505. The optical source may be modulated in the megahertz range to facilitate detection of motion of an object in the view of field of the receivers of the light safety curtain. Controller 502 may be responsive to operation of a detector in optical transceiver module 505 to initiate safety actions. Controller 502 may modulate an output wavelength from the optical source in optical transceiver module 505 to provide communications via the safety curtain. The optical source may be modulated in the gigahertz range to provide the communication channel.

In an embodiment, controller 502 is external to a safety curtain using optical transceiver module 505. Controller 502 in conjunction with memory 514 and peripheral devices 517 may be manage the safety curtain using optical transceiver module 505 through signals provided on bus 508. Bus 508 may be arranged as a parallel communication path, a serial communication path, and/or individual connections, depending on the application. The management may include performing training procedures for the safety curtain to respond to activities within the field of view of receivers of the safety curtain. The management may include shutting down machinery in response to the sensing of an object in the control area of the light curtain. The management may include generating signals to provide visual and/or audio alarming. The management may include transmitting signals to other systems, via an interface to a network on which the other systems have communication paths, regarding a safety event and/or status of the safety curtain. The communications interface may be included with peripheral devices 517. In an embodiment, with controller 502 external to the safety curtain, the safety curtain may include another controller to operate optical transceiver module 505. The additional controller may operate in conjunction with external controller 502.

Various embodiments or combination of embodiments for apparatus and methods for operating a safety curtain having a tunable light source, as described herein, can be realized in hardware implementations, software implementations, and combinations of hardware and software implementations. These implementations may include a machine-readable medium having machine-executable instructions, such as a computer-readable medium having computer-executable instructions, for performing operations to regulate the operation and response management of a safety curtain having a tunable light source. The machine-readable medium is not limited to any one type of medium. The machine-readable medium used will depend on the application using an embodiment of the safety curtain having a tunable light source.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description.

What is claimed is:

1. An apparatus comprising:
   a tunable optical source to generate light at a plurality of wavelengths;
   an optical splitter and combiner coupled to the tunable optical source, the optical splitter and combiner to separate light of different wavelengths into substantially different paths, the tunable optical source and the optical splitter and combiner arranged in a safety curtain; and
   a plurality of output lenses arranged to operatively receive light from the optical splitter and combiner and to operatively direct light received from free space to the optical splitter and combiner, the output lenses configured to direct light generated from the tunable optical source into free space transmission from the safety curtain as light to determine an occurrence of a safety event.

2. The apparatus of claim 1, wherein the tunable optical source includes a tunable laser diode.

3. The apparatus of claim 1, wherein the safety curtain includes control circuitry to chirp the tunable optical source.

4. The apparatus of claim 1, wherein the optical splitter and combine includes a reconfigurable optical add-drop multiplexer.

5. The apparatus of claim 1, wherein the optical splitter and combiner includes an array waveguide device.

6. The apparatus of claim 1, wherein the apparatus includes optical fibers and mirrors, each optical fiber coupling the optical splitter and combiner to a respective one of the mirrors, each mirror arranged to direct light of a respective one of the different wavelengths to a respective one of the output lenses, the light of a respective one of the different wavelengths received at the mirror from the optical splitter and combiner through its corresponding optical fiber.

7. The apparatus of claim 1, wherein the apparatus includes an optical isolator between the tunable optical source and the optical splitter and combiner.

8. The apparatus of claim 1, wherein the apparatus includes a detector to receive light at a plurality of wavelengths directed through free space from another tunable optical source to the plurality of output lenses, the other tunable optical source external to the arrangement of the tunable optical source and the optical splitter and combiner.

9. The apparatus of claim 8, wherein the optical splitter and combiner is arranged to provide the received light to the detector.

10. The apparatus of claim 8, wherein the apparatus includes control circuitry responsive to operation of the detector to initiate safety actions.

11. The apparatus of claim 1, wherein the apparatus includes control circuitry to regulate timing to change an output wavelength from the tunable optical source.

12. The apparatus of claim 1, wherein the apparatus includes control circuitry to modulate an output wavelength from the tunable optical source to provide communications via the safety curtain.

13. An apparatus comprising:
   a tunable optical source to generate light at a plurality of wavelengths;
   an optical splitter coupled to the tunable optical source, the optical splitter to separate light of different wavelengths into substantially different paths to a detector, the tunable optical source and the optical splitter arranged in a safety curtain;
   a plurality of output lenses arranged to operatively receive the light from the optical splitter, the output lenses configured to direct light generated from the tunable optical source into free space transmission from the safety curtain;
   an optical bypass line to receive light from a source different from the tunable optical source; and
   a plurality of switches to control directing of light received at the optical bypass, light generated from the tunable optical source, and light received at the optical splitter from a source external to the safety curtain, the optical splitter arranged as an optical splitter and combiner.

14. A method comprising:
   operating a safety curtain, the safety curtain including a tunable optical source to generate light at a plurality of wavelengths an optical splitter and combiner coupled to the tunable optical source, and a plurality of output lenses arranged to operatively receive light from the optical splitter and combiner and to operatively direct light received from free space to the optical splitter and combiner;
   generating a plurality of light signals using the tunable optical source in the safety curtain, each light signal having a different wavelength and each light signal generated at a different time period; and
   directing each light signal, using the optical splitter and combiner coupled to the tunable optical source, onto a corresponding transmission path, the plurality of light signals directed into substantially different paths, the corresponding transmission path including a respective one of the plurality of output lenses such that the respective light is directed, as light to determine an occurrence of a safety event, via free space transmission from the respective output lens to a detector in the safety curtain, the corresponding transmission path dependent on the wavelength of its associated light signal.

15. The method of claim 14, wherein the method includes chirping each light signal to determine motion of an object traversing the safety curtain.

16. The method of claim 14, wherein generating a plurality of light signals includes selectively outputting each light signal from a tunable laser diode.

17. The method of claim 14, wherein directing each light signal onto a corresponding transmission path includes directing each light signal onto a corresponding optical fiber and directing the output each corresponding optical fiber towards a receiver for the safety curtain.

18. The method of claim 17, wherein the method includes directing each light signal at the receiver to an optical multiplexer to provide each light signal to a common detector.

19. The method of claim 18, wherein the method includes monitoring output of the common detector and responding to a safety event.

20. A system comprising:
   a first unit having a first tunable optical source to generate light at a plurality of wavelengths and having an optical splitter and combiner to separate light of different wavelengths into substantially different paths, the optical splitter and combiner coupled to the tunable optical source, the first unit having a plurality of output lenses arranged to operatively receive light from the optical splitter and combiner and to operatively direct light received from free space to the optical splitter and combiner, the output lenses configured to direct light generated from the tunable optical source into free space transmission from the first unit as light to determine an occurrence of a safety event; and a second unit having an optical combiner to direct the light of different wavelengths onto a common path and having a detector to receive the light directed from the common path, the first unit and the second unit separated by free space and arranged in a safety curtain such that light directed from the first unit is received in the second unit.

21. The system of claim 20, wherein the first unit has a first detector and the second unit has a second tunable optical source.

22. The system of claim 21, wherein the first unit and the second unit are interchangeable.

23. The system of claim 20, wherein the system includes a third unit having a first tunable optical source to generate light at a plurality of wavelengths and having an optical splitter to separate light of different wavelengths into substantially different paths, the third unit coupled to the first unit by an optical bypass line.

24. The system of claim 20, wherein the system includes a processor to manage detection of safety events.

25. The system of claim 20, wherein the system includes a communications interface to provide information regarding an occurrence of a safety event.

* * * * *